July 18, 1961  J. E. COTTLE  2,992,976
POLYMER RECOVERY FROM SOLUTION
Filed March 16, 1959
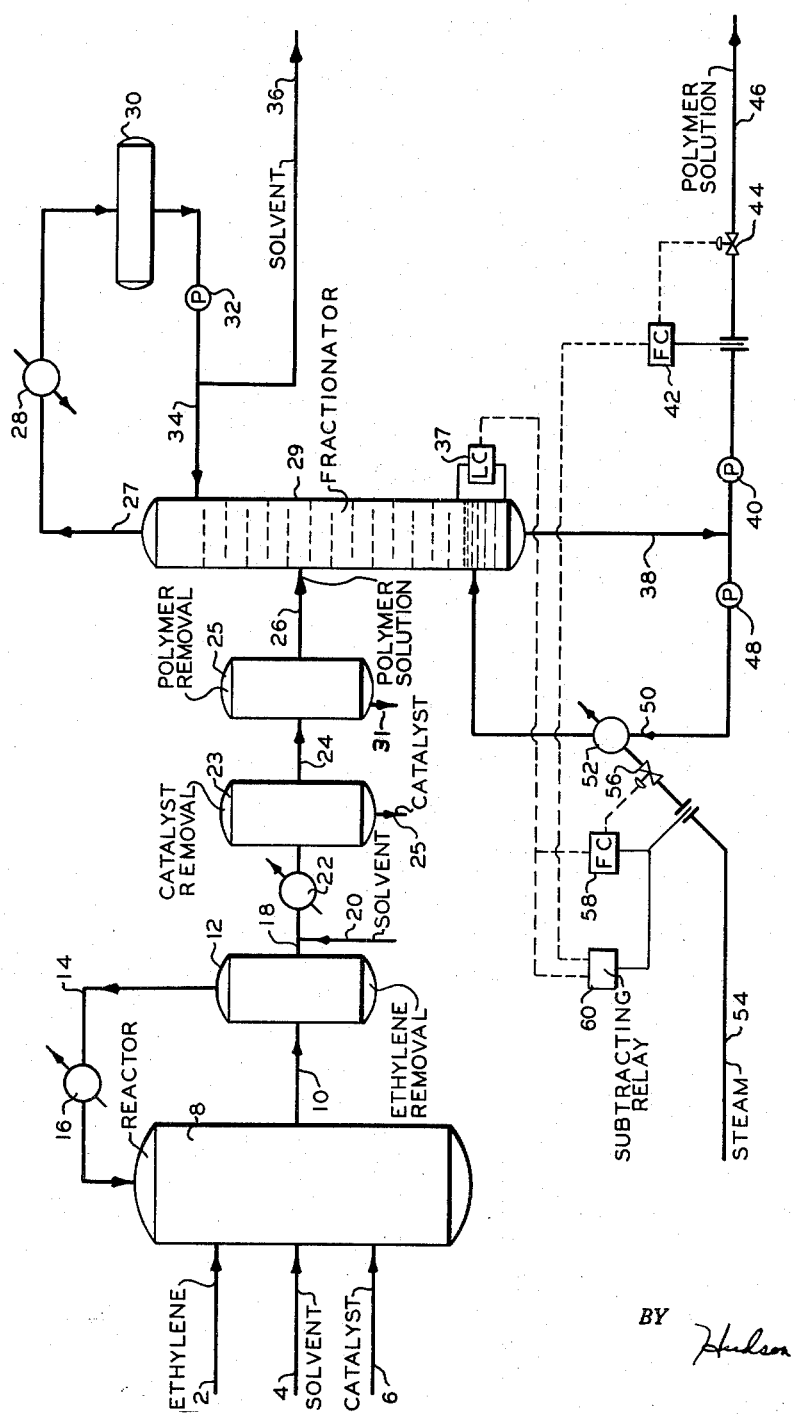
INVENTOR.
J.E. COTTLE
BY Hudson and Young
ATTORNEYS United States Patent Office 2,992,976
Patented July 18, 1961

2,992,976
POLYMER RECOVERY FROM SOLUTION
John E. Cottle, Bartlesville, Okla., assignor to Phillips Petroleum Company, a corporation of Delaware
Filed Mar. 16, 1959, Ser. No. 799,610
14 Claims. (Cl. 202—40)

This invention relates to method and apparatus for the recovery of solvent from a solution of normally solid polymer. In one aspect it relates to the control and operation of a solvent recovery column.

The polymerization of olefins to normally solid polymers is frequently carried out in the presence of a diluent or solvent material. One of the problems associated with recovery of polymer from the polymerization reaction effluent is the separation of solvent from the polymer. In one method of operation the major portion of the polymer is recovered from solution after which the dilute polymer solution which remains is subjected to a preliminary fractionation, followed by flashing to remove residual solvent. The heat required in the preliminary fractionation step is usually supplied by a conventional reboiler or heater which supplies heat by indirect heat exchange to the bottom portion of the fractionator. The efficiency of the reboiler or heater is dependent on the concentration of polymer in the fractionator bottoms and particularly on the viscosity of the polymer solution. Thus increases in solution viscosity reduce heat transfer and if the solution becomes sufficiently viscous fouling of the heat exchange surfaces can occur. The olefin polymers which are present in the solution entering the fractionator are a mixture of materials of widely varying molecular weight and viscosity. Further, the proportion of polymer of each molecular weight and viscosity can vary over a wide range with only small changes in polymerization operation conditions. It thus becomes a problem when separating the solvent to obtain a maximum removal of solvent, but without increasing the polymer concentration in the solution to the level where fouling of the reboiling surfaces occurs.

It is an object of this invention to provide an improved process and apparatus for recovering solvent from a solution of polymer.

Another object of this invention is to provide improved process and apparatus for fractionating a polymer solution containing polymer of variable molecular weight and viscosity.

Still another object of this invention is to provide an improved process and apparatus for the prevention of fouling of reboiling surfaces in the fractionation of polymer from solution.

These and other objects of the invention will become more readily apparent from the following detailed description and discussion.

The foregoing objects are realized broadly by fractionating polymer solution to recover solvent and a concentrated polymer solution, supplying heat to the fractionation zone by indirect heat exchange with the concentrated polymer solution, varying the rate of heat input to the fractionation zone in direct proportion to and in response to changes in the volume of the concentrated solution present in said zone and varying the rate of withdrawal of the concentration solution in inverse proportion to and in response to the rate of heat input to the fractionation zone.

In one aspect of the invention the rate of withdrawal of concentrated polymer solution from the fractionation zone is varied in direct proportion to and in response to the difference between the quantity of heat required in the fractionation zone and the quantity of heat supplied to said zone. In one method the quantity of heat supplied to said zone is measured by multiplying the flow rate of the heating fluid times its temperature differential. In another method a condensable heating fluid is employed and the quantity of heat supplied to the fractionation zone is determined by the flow rate of said heating fluid.

The polymers which are treated within the scope of this invention are those which vary in molecular weight and in viscosity distribution and which in their method of preparation or processing become dissolved in a solvent. Thus, the polymers include a wide variety of thermoplastic resins including broadly those prepared from monomers containing an active $CH_2=C<$ group and more particularly the normally solid olefin polymers such as, for example, polymers or copolymers of monoolefins like ethylene, propylene, butylene, etc. The invention is particularly applicable to polymers of 1-olefins having a maximum of 8 carbon atoms per molecule and no branching nearer the double bond than the 4 position. More often the polymers which are recovered from solution are the polymers of low boiling olefins such as polyethylene, polypropylene, and copolymers of ethylene with propylene, butylene, etc. The polymers can be liquid, tacky or normally solid polymers. The following discussion will be directed to a process in which polyethylene is recovered from solution; however, this is not to be taken in any limiting sense and it is within the scope of the invention to recover normally solid thermoplastic polymers in general from solution.

A preferred polymerization method for the preparation of polymers of monoolefins is described in detail in Hogan et al., Patent No. 2,825,721. The method of Hogan et al. utilizes a chromium oxide catalyst containing hexavalent chromium associated with silica, alumina, silica-alumina, zirconia, thoria, etc. In one embodiment of this patent olefins are polymerized in the presence of a hydrocarbon diluent, for example, an acyclic, alicyclic or, less preferably, aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending upon the particular process conditions employed. When low reaction temperatures, about 150 to 320° F. and a mobile catalyst are used for polymerization, the product polymer is predominantly the terminal vinyl in structure. When polymerization is carried out at higher temperature and in a fixed catalyst bed, the polymer has predominantly transinternal unsaturation. Polymers prepared by both methods are also characterized by their high densities and high percentages of crystallinity at normal room temperatures.

Other less advantageous procedures which employ a different catalyst can also be used for preparing olefin polymers. For example, polymers are prepared in the presence of organo metallic compounds, such as triethyl aluminum plus titanium tetrachloride, mixtures of ethylaluminum halide with titanium tetrachloride, and the like. Another group of catalysts which is used comprises a halide of a group IV metal, such as for example, titanium tetrachloride, zirconium tetrachloride, tin tetrabromide, etc., with one or more free metals selected from the group consisting of sodium, potassium, lithium, rubidium, zinc, cadmium and aluminum. In addition other organometal systems can be employed and olefin polymers can also be prepared by the well known high pressure techniques and by the use of other polymerization catalysts which are well known in the art.

Other polymers which are contemplated within the scope of this invention are prepared by processes and under conditions which are well known to those in the art and therefore need not be set forth in detail herein.

In carrying out the invention in its broad aspect recovery of solvent from dilute polymer solution is effected in a fractionation zone to which heat is provided by passing a heating fluid in indirect heat exchange with concentrated polymer solution contained in the lower portion of said zone. Control of the level of concentrated polymer solution in the bottom of the fractionation zone is provided by varying the rate of heat input to said zone and by varying the rate of withdrawal of concentrated polymer solution from said zone. While both heat input to the fractionation zone and withdrawal rate of polymer solution from the fractionation zone contribute to control of the liquid level therein the degree of control provided by each of these expedients varies depending on the viscosity of the concentrated polymer solution. When the solution viscosity is low, viz. when the concentration of polymer in the polymer solution is below the range desired for most effective operation of the fractionation zone, major or even complete control of the liquid level is provided by vaporization of solvent, that is, by the heat input to the fractionation zone. On the other hand when the polymer content of the concentrated polymer solution is above the desired range of operation (high viscosity) the major factor in control of the level of said solution is the rate of withdrawal of concentrated solution from the fractionation zone. When the viscosity of the concentrated polymer solution is within the desired range both heat input to the fractionation zone and concentrated solution withdrawal from the fractionation zone are effective in controlling the level of polymer solution therein.

Control of the level of concentrated polymer solution in the fractionation zone in the variety of situations set forth is provided by an instrumentation system which incorporates the combined features of varying the heat input to the fractionation zone in direct proportion to and in response to variation in the liquid level in said zone and varying the withdrawal rate of concentrated polymer solution from said zone in direct proportion to and in response to the difference between the quantity of heat required in the fractionation zone and the quantity of heat supplied to said zone. Measurement of the amount of heat supplied to the fractionation zone can be made by a computer which comprises in combination instrumentation for measuring the flow rate of the heating fluid which is passed in indirect heat exchange with the concentrated polymer solution, and the differential temperature of the heating fluid entering and leaving the heat exchanger. Since the specific heat of the heating fluid remains substantially constant over the range of temperature employed the product of the flow rate of the heating fluid and the temperature differential across heat exchanger, which is also provided by the computer, produces a value which is proportional to the heat input to the fractionation zone. One suitable instrumentation arrangement for computing heat input is found in the copending application of Morgan, S.N. 797,240, filed March 4, 1959. This computer comprises a flow transducer and a temperature differential transducer, a first multiplier for introducing heat capacity value to the temperature differential and a second multiplier for multiplying the output from the flow transducer and the first multiplier. A flow controller is provided for controlling flow in response to the computer output. The heat which is actually required in the fractionation zone to maintain the liquid level is established by transmitting a signal from a liquid level controller actuated by said level to the computer, said signal acting to vary the set point of said computer. The differential or spread between the measured heat input and the set point of the computer provides a signal which is transmitted to a flow controller which controls the rate of withdrawal of concentrated polymer solution from the fractionation zone. The quantity of heating fluid which is passed in heat exchange with the concentrated polymer solution is varied by a rate of flow controller which is positioned in parallel with the afore-described computer system. The set point of the latter controller is also varied by a signal transmitted from the level controller on the concentrated polymer solution.

To illustrate the operation of this system, if the level in the fractionation zone increases a signal is transmitted from the liquid level controller to the controller on the heating fluid to the heat exchanger which resets this controller and causes an increased flow of heating fluid. The same signal resets the computer thereby establishing a spread between the heating fluid flow and the set point of the computer. If the solution in the fractionation zone contains a higher concentration of polymer than is desired, which is reflected by increased viscosity of said solution, transfer of heat in the exchanger cannot be adequately increased and the spread between the heat input and the set point of the computer persists due to inability of the heat exchange system to provide the heat called for by the liquid level controller. This spread actuates the withdrawal valve on the fractionation zone bottoms such that flow of concentrated polymer solution from the fractionation zone is accelerated. Removal of concentrated polymer solution from the fractionation zone remains at a high rate until the heat required in the system and the heat supplied thereto become balanced, at which time the bottoms flow is substantially reduced or terminated entirely. If instead of being unduly concentrated in polymer, the solution in the bottom of the fractionation zone contains less polymer than is desired the heat transfer rate in the heat exchanger is high which enables the exchanger to provide the heat called for by the liquid level controller. In this instance the spread between the set point of the computer and the actual heat input closes rapidly and little or no withdrawal of solution from the bottom from the fractionation zone takes place. For polymer concentrations between the two extremes set forth the instrumentation system operates to provide simultaneous heat input to the fractionation zone and withdrawal of concentrated polymer solution from said zone.

In general any of the known heat exchange fluids can be employed in providing heat required in the fractionation zone. Examples of suitable materials include liquids such as aliphatic, cycloaliphatic or aromatic hydrocarbons, organic chemicals, etc., steam or other condensable liquids and high temperature non-condensable vapors. The amount of heat which can be transferred in the heat exchange system and the degree to which this system can satisfy the heat requirements established by the liquid level in the fractionation zone depends not only on the viscosity of the concentrated polymer solution but also on the temperature of the heating fluid. Since concentrated polymer solution is withdrawn from the bottom of the fractionation zone only when a spread or difference exists between the heat required in the system and the heat actually supplied thereto it is necessary that provision be made to prevent excess heat input, i.e., excessive boiling of solvent from the solution, during periods when no concentrated polymer solution is being withdrawn from the system. In one method this is accomplished by establishing the inlet temperature of the heating fluid at a predetermined level so that a spread between the heat required and heat input will be established when the viscosity of the concentrated polymer solution in the fractionation zone reaches a certain maximum value. For example, when recovering cyclohexane solvent from a dilute solution of polyethylene the inlet temperature of the heating fluid is desirably maintained about 50° F. above the boiling point of the concentrated polymer solution, when operating in the desired range of concentration, i.e., between about 300 and about 425° F. Since the boiling temperature of the polymer solution increases with increased polymer content the same result can also be effected by measuring the temperature in the bottom of the fractionation zone and providing withdrawal of concentrated polymer solution from said zone when the bottoms temperature exceeds a predetermined value. In still another method excessive boil off of solvent is prevented by providing a by-pass around the control valve which controls the withdrawal of concentrated polymer solution from the fractionation zone whereby a small continuous stream of solution can be removed from said zone.

In one embodiment of the invention a more simplified instrumentation system is provided by utilizing a condensable fluid, for example steam, for supplying heat to the fractionation zone. When using a condensable fluid the quantity of heat introduced to the fractionation zone is directly proportional to the amount of steam which can be condensed in the heat exchange system. It thus becomes possible to substitute for the computer system hereinbefore described a simple measuring device which is capable of measuring spread between the set point provided by the liquid level controller and the flow of steam to the heat exchange system.

For the purpose of describing the invention in a preferred embodiment reference is had to the accompanying drawing which is a diagrammatic illustration of a polymerization unit and associated fractionation equipment and instrumentation suitable for carrying out the invention.

Referring to the drawing, ethylene, cyclohexane diluent and chromium oxide catalyst are introduced to reactor 8 through conduits 2, 4 and 6, respectively. For ease of handling the catalyst is slurried in cyclohexane before it is introduced to the reactor. During polymerization the material in the reactor is maintained in a highly agitated state by means of a mechanical mixer or other conventional mixing means (not shown). The reaction is carried out at a temperature of about 285° and a pressure of about 500 p.s.i., and for a period of time sufficient to convert a portion of the ethylene feed to the solid ethylene polymer (at normal atmospheric temperatures). The reaction effluent leaves the reactor through conduit 10 and enters a separation zone 12 wherein a stream comprising principally unconverted ethylene and some solvent is separated and returned to the reactor through conduit 14 and cooler 16. Following this step the effluent is combined with additional solvent introduced through conduit 20, the mixture then passing through exchanger 22 wherein the temperature is increased. The effluent then passes to catalyst recovery zone 23 through conduit 18. This zone may be a filter, a centrifuge, or the like, designed to operate at superatmospheric pressure. Separated catalyst which is removed through conduit 25 can be recycled to the reactor or discarded. As necessary all or part of the recycled catalyst can be subjected to a regeneration treatment with oxygen for the removal of heavy polymers deposited thereon during polymerization. The substantially catalyst-free effluent from catalyst removal zone 23 is introduced through conduit 24 to polymer removal zone 25 wherein the major portion of the polymer is separated and recovered. The remaining reaction effluent now comprising a dilute solution of polyethylene in cyclohexane, about 0.05 weight percent, is introduced through conduit 26 to fractionator 29. In the fractionator which can be a conventional bubble tray tower, perforated tray tower or other contacting tower suitable for separation of the components of the polymer solution, the major portion of the solvent is vaporized, being removed overhead through conduit 27. The fractionator can be operated over a wide range of pressure; however, generally it is desirable to maintain the pressure at a minimum. Suitable operating conditions include a pressure of about 35 p.s.i.g. and a tower temperature of about 250° F. The overhead solvent vapors from the fractionator are condensed in condenser 28 and enter accumulator 30. Accumulated solvent is withdrawn through pump 32 and divided, with a portion being returned to the fractionator through conduit 34 as reflux and the remainder being yielded from the system through conduit 36.

Through vaporization of solvent from the entering feed a concentrated polymer solution, containing about 1.5 weight percent polymer, is formed and accumulates in the lower portion of the fractionator. To prevent the fractionator from either running dry or filling with liquid, a liquid level controller 37 is provided which maintains a level of liquid in the bottom of the fractionator. Concentrated polymer solution is withdrawn from the fractionator through conduit 38, pump 40 and yielded in part from the unit through conduit 46. The remainder of the polymer solution is transferred from conduit 38 through pump 48, passed through conduit 50 and steam heater 52 and returned to the fractionator. The latter material is heated sufficiently by steam condensing in heater 52 to provide the thermal requirements of the fractionator, namely the heat required to vaporize the solvent removed overhead from the tower. The concentrated polymer solution product in conduit 46 can be further processed as desired to separate and recover the polymer and solvent components.

As pointed out previously the efficiency of the exchanger which supplies heat to the fractionator is dependent on the concentration of polymer in the fractionator bottoms and particularly on the viscosity of the polymer. Thus, increases in viscosity of the polymer reduce heat transfer and if the polymer becomes sufficiently viscous fouling of the heat exchange surfaces can occur. The polyethylene which is formed in the polymerization reaction comprises a mixture of polymer molecules of widely varying molecular weight and viscosity. Furthermore, the proportions of the various molecular weight fractions of the polymer can and do vary over a wide range with only small changes in polymerization operating conditions. In addition the total polymer concentration in the polymerization effluent is also subject to variation. It is apparent, therefore, that the polymer solution entering the fractionator can vary both in polymer composition, which is reflected by variations in viscosity, and also in the percentage of polymer which is present in the solvent. The control instrumentation of the accompanying drawing which will now be described, functions to reduce the variations in polymer composition and content in the fractionator bottoms and thereby provide a concentrated polymer solution of more uniform composition whereby fouling of heat exchange surfaces is substantially eliminated.

In the operation of the control system a signal which is proportional to changes in the volume (or level) of concentrated polymer solution in the bottom of the fractionator is transmitted from liquid level controller 37 to flow recorder controller 58. FC58, which is a conventional controller having proportional mode and integral reset action, in turn transmits a signal to control valve 56 which controls the steam through steam heater 52. A subtracting relay 60 which is disposed in parallel with FC58 also receives a signal from liquid level controller 37 and transmits in turn a signal which changes the set point of flow recorder controller 42. The latter controller transmits a signal to control valve 44 which controls the flows of polymer solution through conduit 46.

To further illustrate the action of the system if the liquid level in the fratcionator should rise a signal is transmitted from liquid level controller 37 to flow recorder controller 58 and subtracting relay 60 which increases the set point of these instruments. In turn FC58 causes the control valve 56 on the steam to open wider admitting more steam to the steam heater. The output of subtracting relay 60, which is used to reset FC42 on the tower bottoms, is proportional to the difference between the steam flow rate and the set point. Since the spread between the stream flow rate and set point is increased a signal is transmitted from subtracting relay 60 to FC42 which causes valve 44 to open, increasing the rate of withdrawal of concentrated polymer solution. If the solution in the bottom of the fractionator is dilute in polymer the steam flow rate will quickly respond to the new set point since the heat transfer rate in the steam heater will be sufficiently high to satisfy the heat required in the fractionation zone. As a result valve 44 will quickly return to its original position reducing the flow of concentrated polymer solution from the bottom of the fractionator to its previous value. If on the other hand the solution in the bottom of the fractionator is concentrated in polymer, heat exchange efficiency in heater 52 is reduced, a wide spread between the steam flow rate and set point persists and the withdrawal rate of concentrated polymer solution through conduit 46 remains at a high rate. This condition will obtain until the polymer concentration has been reduced to the point where steam supply equals demand. From the foregoing it is apparent that the control system operates to maintain a predetermined polymer concentration and polymer viscosity in the fractionator bottoms. The control system is also effective in controlling decreases in level in the fractionator except that such decreases necessitate an opposite action of the control system, namely a reduction of steam flow to heater 52 and a reduction in the withdrawal rate of concentrated polymer solution from the bottom of the fractionator.

As previously stated the instruments employed in carrying out the invention are conventional instruments and are readily available to the art. Both flow recorder controllers 42 and 58 should have both proportional mode and integral reset actions. Subtracting relay 60, however, requires only a proportional action, so that its output will be proportional to the difference between the steam flow rate and the steam set point . A suitable subtracting relay is described in Foxboro Technical Information Bulletin 37-A-57a (September 12, 1956). Other suitable specific instruments for use in carrying out the invention are described in "Fundamentals of Instrumentation for the Industries," 'Minneapolis-Honeywell, copyright 1952.

The preceding discussion has been directed to a specfic embodiment of the invention; however, this is not to be construed in any limiting sense and it is within the scope of the invention to utilize other equivalent fractionation equipment and instrumentation to provide the desired control of concentrated polymer solution concentration and composition. It is also broadly within the scope of the invention to concentrate solutions of any of the polymers or types of polymers previously described herein.

The following data is presented in illustration of a typical application of the invention.

EXAMPLE

The ethylene polymer of this example is prepared in the presence of a catalyst comprising 2.5 percent by weight of chromium as chromium oxide, containing hexavalent chromium, with silica-alumina, prepared by impregnating particulate silica-alumina with a solution of chromium oxide followed by drying and activation in air at gradualy increasing temperatures up to 950° F. The following conditions are employed in the preparation of the ethylene polymer and in the subsequent concentration of said polymer in solution in the method of this invention.

| Flows: | Lb./hr. |
|---|---|
| Feed to reactor (8) | 43,000 |
| Composition: | |
|   Ethylene | 13.40 wt. percent |
|   Cyclohexane | 86.40 wt. percent |
|   Catalyst | 0.20 wt. percent |
| Reactor effluent (10) | 43,000 |
| Composition: | |
|   Ethylene | 5.40 wt. percent |
|   Cyclohexane | 86.40 wt. percent |
|   Polymer | 8.00 wt. percent |
|   Catalyst | 0.20 wt. percent |
| Reactor temperature | 285° F. |
| Reactor pressure | 500 p.s.i.a. |

Fractionation

| Flows: | Lb./hr. |
|---|---|
| Feed to Fractionator (26) | 39,560 |
| Composition: | |
|   Cyclohexane | 99.95 wt. percent |
|   Polymer | 0.05 wt. percent |
| Fractionator overhead (27) | 38,240 |
| Fractionator bottoms (46) | 1,320 |
| Composition: | |
|   Cyclohexane | 98.5 wt. percent |
|   Polymer | 1.5 wt. percent |
| Fractionator top temperature (29) | 259° F. |
| Fractionator bottom temperature (29) | 270° F. |
| Fractionator pressure (29) | 35 p.s.i.g. |

During the above process the polymerization conditions are changed such that the feed to fractionator 29 is increased in polymer content and the molecular weight of the polymer contained therein also increases. As a result the material leaving the fractionator bottoms is substantially increased in viscosity and increased in polymer concentration to about 3.0 weight percent. The increased viscosity and concentration of polymer in the fractionator bottoms reduces the efficiency of steam heater 52 whereby the heat introduced to the tower bottoms is decreased and the level of concentrated polymer solution in the fractionator begins to increase. Immediately a signal is transmitted from liquid level controller 37 to flow recorder controller 58 which in turn actuates control valve 56 to increase the flow of steam through heater 52. The signal which is transmitted from liquid level controller 37 also actuates subtracting relay 60 which increases the set point of flow recorder controller 42 thereby opening control valve 44 and increasing the flow of polymer solution from the bottom of the fractionator. The operation of the control system in this manner continues until the polymer solution in the bottom of the fractionator is reduced in polymer content and in viscosity to values in the same range as those of which prevailed before the tower level increased, at which point the operation of the fractionator again becomes stabilized.

Having thus described the invention by providing a specific example thereof it is to be understood that no undue limitations or restrictions are to be drawn by reason thereof and that many modifications and variations are within the scope of the invention.

I claim:

1. In a process for the recovery of solvent from a solution of normally solid polymer, said polymer solution being of variable viscosity, in which said solution is fractionated in a zone to which heat is supplied by indirect heat exchange with concentrated polymer solution, in which solvent is withdrawn from the fractionation zone as one product and concentrated polymer solution as another product, the improvement which comprises varying the rate of heat input to said zone in direct proportion to and in response to changes in the volume of concentrated polymer solution present therein and varying the rate of withdrawal of the concentrated polymer solution from said zone in inverse proportion to and in response to the rate of heat absorbed in said zone.

2. The process of claim 1 in which the rate of withdrawal of concentrated polymer solution from the fractionation zone is varied in direct proportion to and in response to the difference between the quantity of heat required in the fractionation zone and the quantity of heat supplied to said zone.

3. The process of claim 2 in which heat is supplied to the fractionation zone by indirect heat exchange between a condensable liquid and concentrated polymer solution.

4. The process of claim 3 in which the polymer is polyethylene.

5. The process of claim 4 in which the solvent is cyclohexane.

6. In a process for the recovery of cyclohexane from a dilute solution of normally solid polyethylene, said polymer solution being of variable viscosity, in which said solution is fractionated in a zone to which heat is supplied by passing steam in indirect heat exchange with concentrated polymer solution, in which solvent is withdrawn from the upper portion of the fractionation zone as one product and concentrated polymer solution from the lower portion of the fractionation zone as another product, the improvement which comprises varying the rate of heat input to said zone in direct proportion to and in response to changes in the volume of the concentrated solution present therein and varying the rate of withdrawal of concentrated polymer solution from said zone in inverse proportion to and in response to the rate of heat absorbed in the said zone.

7. The process of claim 6 in which the rate of withdrawal of concentrated polymer solution from the fractionation zone is varied in direct proportion to and in response to the difference between the quantity of heat required in the fractionation zone and the quantity of heat supplied to said zone.

8. In a process for the recovery of cyclohexane from a dilute solution of normally solid polyethylene, said polyethylene solution being of variable viscosity, in which said solution is fractionated in a zone to which heat is supplied by passing steam in indirect heat exchange with concentrated polymer solution, in which solvent is withdrawn from the upper portion of the fractionation zone as one product and concentrated polymer solution from the lower portion of the fractionation zone as another product, the improvement which comprises varying the rate of heat input to said zone in direct proportion to and in response to changes in the volume of the concentrated polymer solution present therein and varying the rate of withdrawal of concentrated polymer solution from said zone in direct proportion to the difference between the steam flow rate required to control the liquid level in the fractionation zone and the flow rate of the steam consumed in heating said zone.

9. In apparatus for the recovery of normally solid polymer from dilute solution comprising a fractionation means, means for maintaining a liquid level in lower portion of said fractionation means, indirect heat exchange means for adding heat to the bottom of said fractionation means, conduit means for withdrawing separated solvent from the upper portion of the fractionation means and conduit means for withdrawing concentrated polymer solution from the lower portion of said fractionation means, the improvement which comprises instrumentation means for varying the rate of heat input to the heat exchange means in direct proportion to and in response to variations in the liquid level in the fractionation means and instrumentation means for varying the rate of withdrawal of concentrated polymer solution from the fractionation means in inverse proportion to and in response to the rate of heat absorbed in said zone.

10. The apparatus of claim 7 in which instrumentation means are provided for varying the rate of withdrawal of concentrated polymer solution from the fractionation means in direct proportion to and in response to the difference between the quantity of heat required in the fractionation zone and the quantity of heat supplied to said zone.

11. The apparatus of claim 10 in which the means for varying the rate of heat input to the fractionation means comprises a rate of flow controller and the means for measuring the quantity of heat supplied to said fractionation means comprises a computer which comprises a rate of flow controller for measuring the flow of heating fluid in combination with a differential temperature recorder for measuring temperature difference across the heat exchange means.

12. The apparatus of claim 10 in which the means for varying the rate of heat input to the fractionation means comprises a rate of flow controller and the instrumentation means for measuring the quantity of heat supplied to the fractionation means comprises a flow meter operatively connected to said heat exchange means.

13. In apparatus for the recovery of normally solid polymer from dilute solution comprising fractionator, a liquid level controller for maintaining a liquid level in the lower portion of the fractionator, an indirect heat exchanger in open communication with the bottom of the fractionator, means for passing a condensable heating fluid through said heat exchanger, valve means for varying the rate of flow of said heating fluid, conduit means for withdrawing separated solvent from an upper portion of the fractionator, conduit means for dithdrawing cnoctnegsii fractionator, conduit means for withdrawing concentrated polymer solution from a lower portion of said fractionator and valve means for controlling the rate of flow of withdrawn concentrated polymer solution, the improvement which comprises a first rate of flow controller adapted to transmit a signal to the valve controlling the flow rate of heating fluid, having a set point which is varied in direct proportion to and in response to variations in the level in the fractionator by a signal from the liquid level controller, a second rate of flow controller adapted to transmit a signal to the valve through which concentrated polymer solution is removed from the fractionator, a subtracting relay in parallel with and interconnected with the first rate of flow controller, having a set point which is varied in direct proportion to and in response to variations in the level in the fractionator by said signal from the liquid level controller, adapted to transmit a signal to the second rate of flow controller which is directly proportional to the difference between the set point of said subtracting relay and the rate of flow of the heating fluid.

14. In apparatus for the recovery of normal solid polymer from dilute solution comprising a fractionator, a liquid level controller for maintaining a liquid level in the lower portion of the fractionator, an indirect heat exchanger in open communication with the bottom of the fractionator, conduit means for passing a heating fluid through said heat exchanger, valve means for varying the rate of flow of said heating fluid, conduit means for withdrawing separated solvent from the upper portion of the fractionator, conduit means for withdrawing concentrated polymer solution from the lower portion of said fractionator and valve means for controlling the rate of flow of withdrawn concentrated polymer solution, the improvement which comprises a first rate of flow controller adapted to transmit a signal to the valve controlling the rate of flow of heating fluid, having a set point which is varied in direct proportion to and in response to variations in the level in the fractionator by a signal from the liquid level controller, a second rate of flow controller adapted to transmit a signal to the valve through which concentrated polymer solution is removed from the fractionator, a computer in parallel with and interconnected with the first rate of flow controller adapted to measure the heat transferred in said exchanger by the heating fluid, said computer having a set point which is varied in direct proportion to and in response to variations in the level in the fractionator by said signal from the liquid level controller, said computer being adapted to transmit a signal to the second rate of flow controller which is directly proportional to the difference between the set point of the said computer and the heat input to the fractionator as measured by said computer.

References Cited in the file of this patent

UNITED STATES PATENTS

| | | |
|---|---|---|
| 1,940,802 | Kallam | Dec. 26, 1933 |
| 2,465,716 | Engel | Mar. 29, 1949 |
| 2,598,036 | Cahill et al. | May 27, 1952 |
| 2,881,118 | Spann et al. | Apr. 7, 1959 |

UNITED STATES PATENT OFFICE
CERTIFICATE OF CORRECTION

Patent No. 2,992,976                            July 18, 1961

John E. Cottle

It is hereby certified that error appears in the above numbered patent requiring correction and that the said Letters Patent should read as corrected below.

Column 10, line 29, strike out "fractionator, conduit means for dithdrawing cnoctnegsii".

Signed and sealed this 6th day of March 1962.

(SEAL)
Attest:

ERNEST W. SWIDER                           DAVID L. LADD
Attesting Officer                             Commissioner of Patents